(No Model.)

G. S. BLACK.
GUIDE ROLL FOR BAND SAWS.

No. 353,530. Patented Nov. 30, 1886.

WITNESSES.
Chas. N. Leonard,
Charles L. Thurker.

INVENTOR.
George S. Black,
PER
C. Bradford,
ATTORNEY.

N. PETERS, Photo-Lithographer, Washington, D. C.

UNITED STATES PATENT OFFICE.

GEORGE S. BLACK, OF INDIANAPOLIS, INDIANA.

GUIDE-ROLL FOR BAND-SAWS.

SPECIFICATION forming part of Letters Patent No. 353,530, dated November 30, 1886.

Application filed March 15, 1886. Serial No. 195,193. (No model.)

*To all whom it may concern:*

Be it known that I, GEORGE S. BLACK, of the city of Indianapolis, county of Marion, and State of Indiana, have invented certain new and useful Improvements in Guide-Rolls for Band-Saws, of which the following is a specification.

The object of my said invention is to produce guides for the back side of a band-saw, by which it may be kept in position without the usual amount of friction, and by which it may be tightened or loosened. This object is accomplished by providing adjustable rolls mounted on an adjustable slide, which in turn is mounted in a bracket secured to the column of the mill, as will be hereinafter more particularly described.

Figure 1:
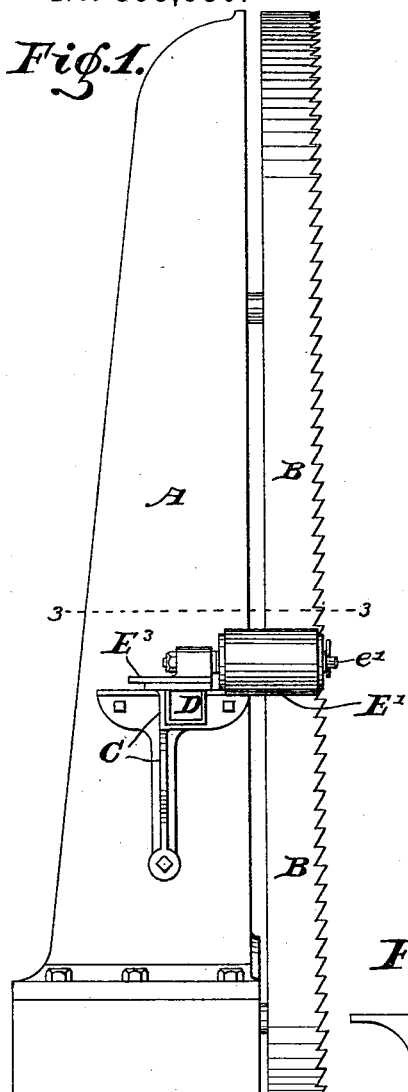
Figure 2:
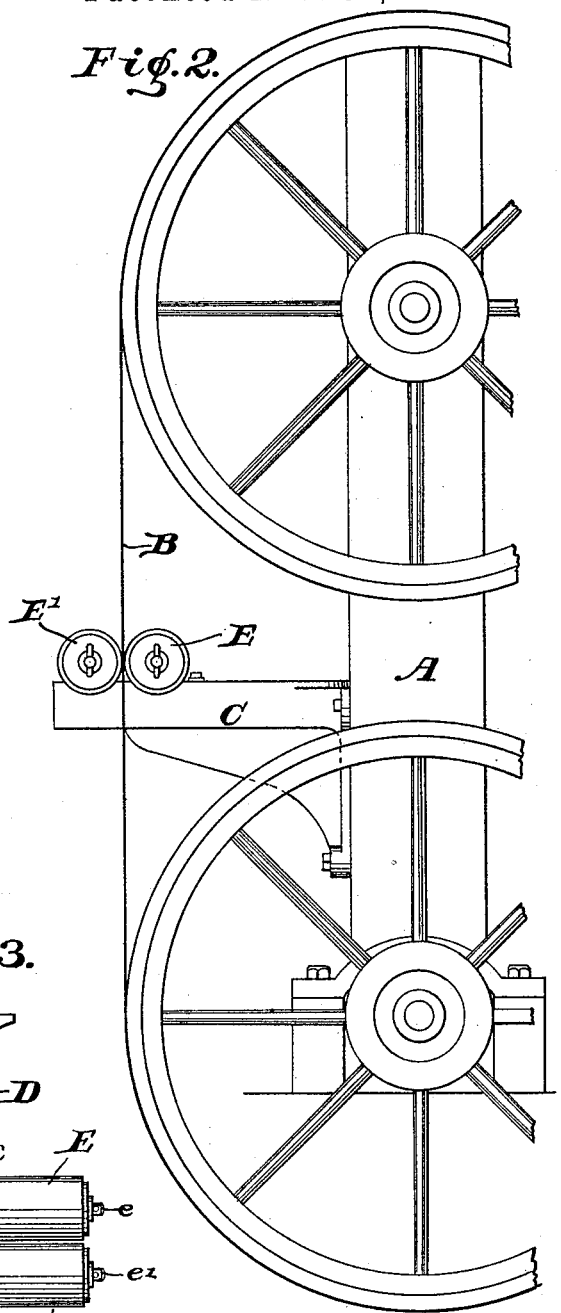
Figure 3:
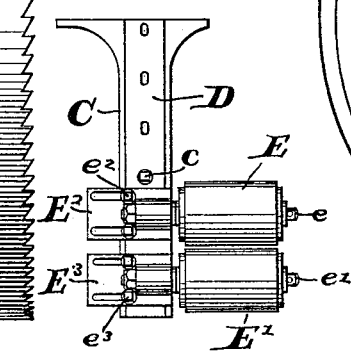

Referring to the accompanying drawings, which are made a part hereof, and on which similar letters of reference indicate similar parts, Figure 1 is a rear side elevation of a band-saw and the column upon which it is mounted, with my invention applied thereto; Fig. 2, a forward side elevation of the same; and Fig. 3, a plan view of the bracket and adjustable rolls and slide, as seen when looking downwardly from the dotted line 3 3 in Fig. 1.

In said drawings the portion marked A represents the column of the mill, B the band-saw, C the bracket, D the adjustable slide mounted therein, and E E' adjustable rolls mounted on stud-shafts secured to said slide.

The column A and band-saw B are or may be of any usual or desired construction, and will not be further described herein, except incidentally in describing the invention.

The bracket C is securely bolted to the column A, as shown, and is provided with a groove, in which the slide D is mounted and operates. It may be made adjustable on the column, if desired.

The slide D is mounted in a groove in the bracket C, and is secured thereto by a bolt, $c$, which passes through one of several holes in said slide, as indicated. These holes are arranged at uniform distances apart to correspond with the usual variable diameters of the wheels over which the saw runs. Band-saw wheels are usually either six, seven, eight, or nine feet in diameter, and these holes are therefore arranged, as a rule, six inches apart to accommodate these various sizes. They are elongated somewhat, as shown, (see particularly Fig. 3,) to permit of an exact adjustment to the position desired.

The rolls E E' are mounted upon stud-shafts $e$ $e'$, which are firmly secured to brackets $E^2 E^3$, which are in turn secured to the bar or slide D by means of bolts $e^2 e^3$ passing through slots therein, as shown. By means of these slots these brackets $E^2 E^3$ may be adjusted transversely of the bar D, and thus the rollers may be set to accommodate different widths of saws, or to accommodate the saw as it is worn from one width to another. The saw in running against these rolls E E' is not subject to the amount of friction which exists when it runs against stationary guides such as have heretofore been provided. The adjustment is also valuable in adjusting the tension of the saw somewhat should it become necessary to use the device for that purpose.

Having thus fully described my said invention, what I claim as new, and desire to secure by Letters Patent, is—

1. The combination of the band-saw B, bracket C, having a groove in its upper surface, a slide-bar, D, having several holes and mounted in said groove, a bolt, $c$, by which said bar is secured in said groove, brackets $E^2 E^3$, adjustably secured to said bar and carrying stud-shafts, and rolls E E', mounted upon said stud-shafts, substantially as set forth.

2. The combination of a band-saw, a bracket secured to its column, brackets $E^2 E^3$, provided with slots and adjustably secured on said bracket, stud-shafts on said brackets $E^2 E^3$, and rolls mounted on said stud-shafts, substantially as shown and described.

In witness whereof I have hereunto set my hand and seal, at Indianapolis, Indiana, this 5th day of March, A. D. 1886.

GEORGE S. BLACK. [L. S.]

In presence of—
 C. BRADFORD,
 CHARLES L. THURBER.